May 22, 1956   S. KERR   2,746,676
PREDETERMINED VALUE ENTERING MEANS FOR ACCOUNTING MACHINES
Filed Dec. 16, 1953   6 Sheets-Sheet 1

FIG. I

INVENTOR
SAMUEL KERR
BY Elmer W. Edwards
AGENT

May 22, 1956  S. KERR  2,746,676
PREDETERMINED VALUE ENTERING MEANS FOR ACCOUNTING MACHINES
Filed Dec. 16, 1953  6 Sheets-Sheet 3

INVENTOR
SAMUEL KERR
BY *Elmer W. Edwards*
AGENT

United States Patent Office 2,746,676
Patented May 22, 1956

2,746,676

PREDETERMINED VALUE ENTERING MEANS FOR ACCOUNTING MACHINES

Samuel Kerr, Orange, N. J., assignor to Monroe Calculating Machine Company, Orange, N. J., a corporation of Delaware Application December 16, 1953, Serial No. 398,566

9 Claims. (Cl. 235—60.47)

This invention relates to amount entering means for listing calculators and more particularly to improved means whereby a fixed amount may be entered automatically into the register of such machines and printed upon the record sheet. It is current practice for many banking institutions to apply a fixed monthly charge fee for each personal checking account and to record such fee upon the ledger sheet and customer's statement forms once each month. Such entries are customarily made in consecutive order at some convenient date of the month and one object of the invention herein disclosed is to simplify this work and to minimize the chance of error on the part of an operator.

The invention contemplates the provision of means for effecting selective operation of certain of the zero column latches of the keyboard directly through operation of the shiftable platen carriage in its movement to a preselected columnar position. Said operation of the platen carriage not only serves to release the selected column latches to permit of subsequent operation of related actuator means for the register and type bars but also serves to condition said latches in such manner as to control the extent of movement of the related actuator means, so that a predetermined fixed amount is caused to be entered and recorded upon a record sheet.

A further object of the invention is to do the above automatically. This is accomplished by having the means operable by the carriage for operating the column latches; also effect operation of the machine cyclic clutch means whereby the fixed value entries are registered and printed entirely automatically.

Further, the invention accomplishes these results in extremely simple manner and with a minimum of parts required.

With the foregoing and incidental features in view, the invention includes the novel construction and combination of parts, the essential elements of which are set forth in the appended claims and a preferred embodiment of which is hereinafter described with reference to the drawings which accompany and form a part of this specification.

Figure 1:
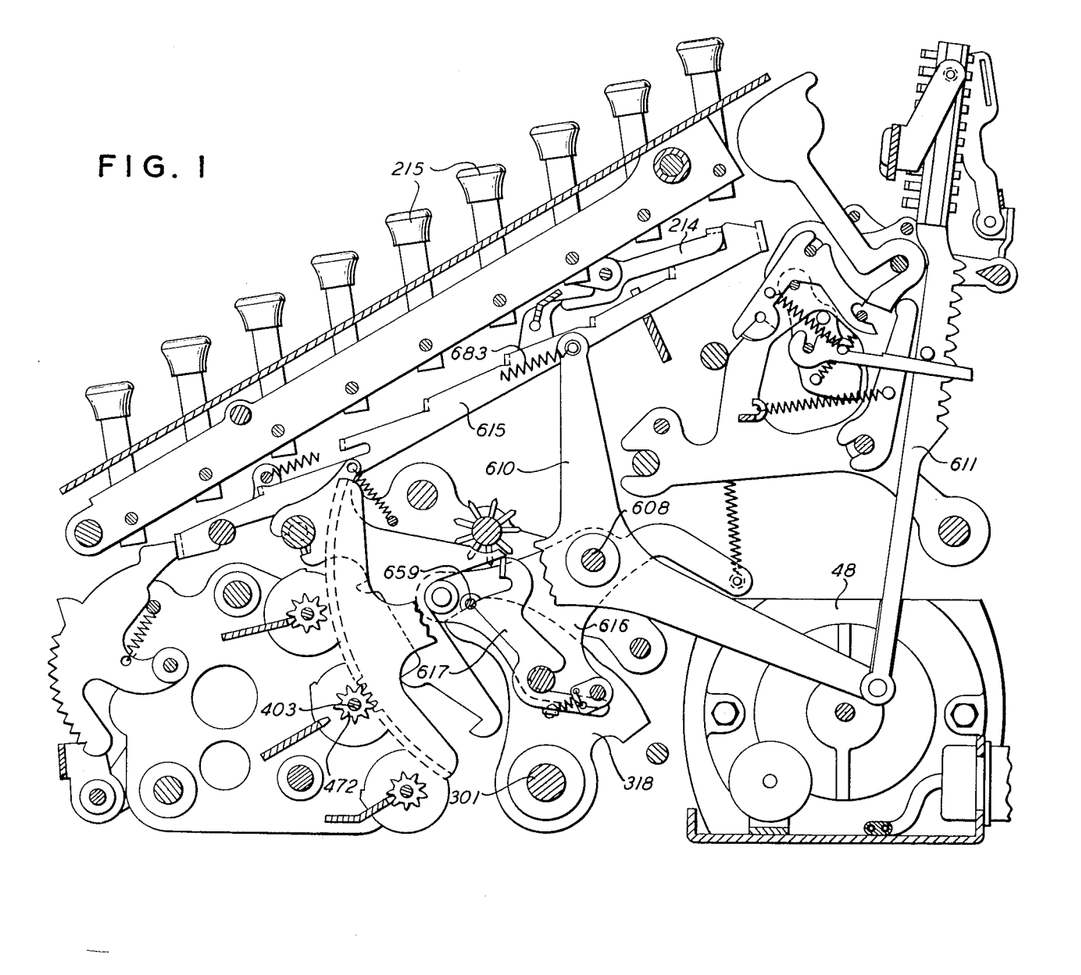
Fig. 1 is a right side elevation showing a cross section of the keyboard, registering and printing devices.

The adding listing machine to which the invention is shown as applied is of well known type illustrated in U. S. Patent 1,946,572, issued February 13, 1934, to Loring P. Crosman, and entitled "Listing Calculator," and U. S. Patent 1,994,211, issued to the same inventor on March 12, 1935, entitled "Listing Adding Machine." It will be sufficient to describe the machine proper very generally and to say that for each denominational order the machine is provided with a three armed differential actuator lever numbered 610 (Fig. 1) loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys are depressible to represent a value and when depressed are latched in position with the bottoms of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar 615 and lever 610 in any column in which no key is depressed.

A rock shaft 301 is provided with cam means 318 for governing the movement of a spring tensioned rocker frame 616, carrying a series of dogs 617, normally engaged by stud 659 of the lever 610. As shaft 301 is rotated forwardly (counterclockwise in Fig. 1) frame 616 will be rocked about shaft 608 and any of the levers 610 which have been released by depression of digit keys 215 will be allowed to rotate, under the influence of their springs 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Figure 2:
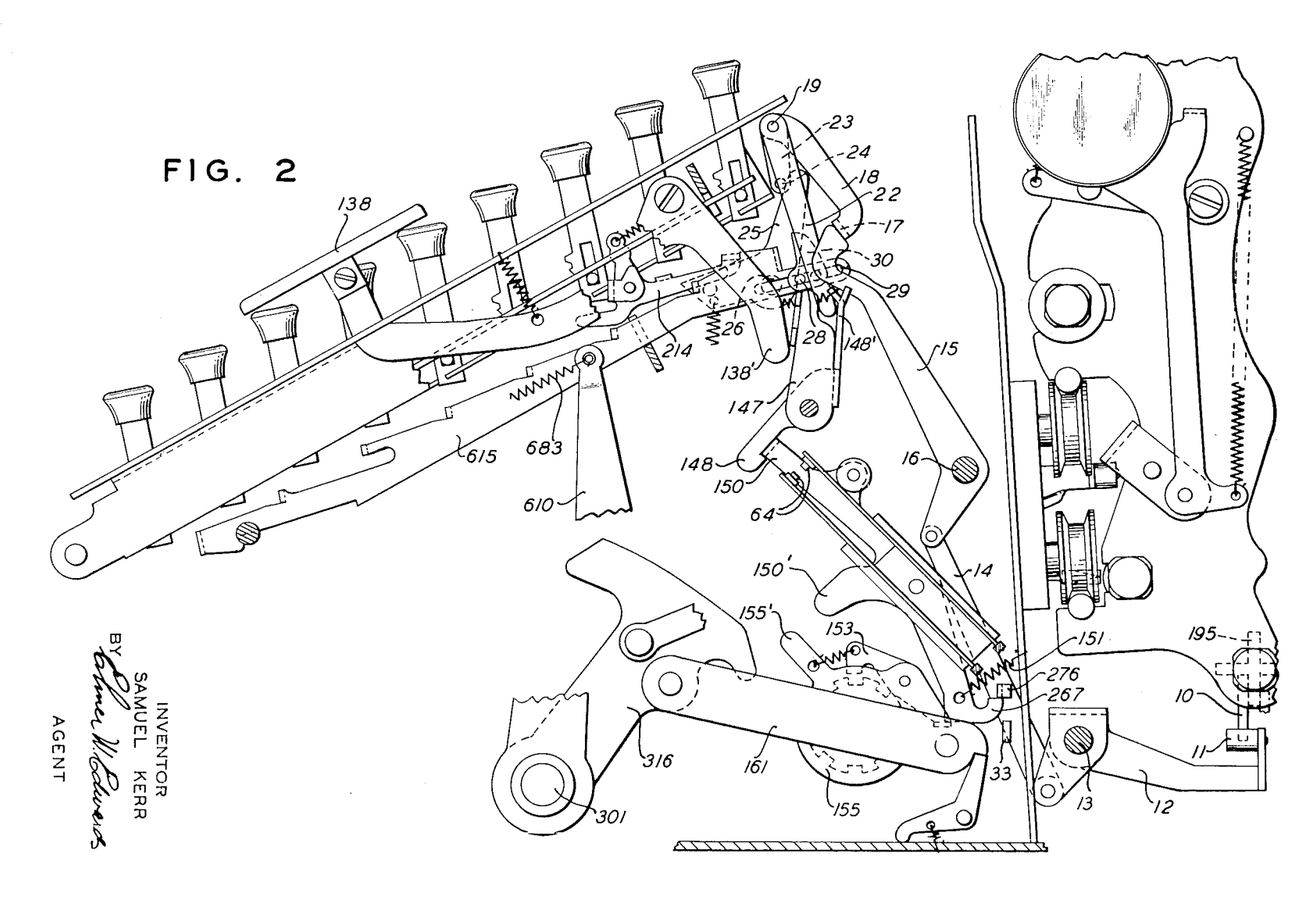
Fig. 2 is a right side elevation of means operable by the platen carriage to release the cyclic clutch and to adjust selected column latches for controlling an automatic value entering.

Shaft 301 is oscillated by an electric motor 48, connected through suitable gearing and clutch means, with a crank arm 155 (Fig. 2) connected by a rod 161 to an arm 316, fast upon shaft 301, so that as crank arm 155 is rotated, shaft 301 will be oscillated.

Motor operation is normally controlled by motor bars or keys through a clutch lever 150 which is provided with a roller adapted to close contact members 64 in the motor circuit after lever 150 is moved out of restraining engagement with the spring operated clutch. A spring 151 tends to pull lever 150 away from the clutch, the lever being normally held in clutch engaging position by means of a latch 148. Latch 148 is controlled by a trigger 147, lying in the path of movement of a lever arm 138' connected with an add key or plus bar 138. Upon depression of key 138, trigger 147 is rocked clockwise to release latch 148 and clutch lever 150 will be pulled out of engagement with the clutch to start the machine in operation.

Upon release of key 138, latch 148 will return under spring action into latching position and, toward the end of the cycle of operation, an arm 155' connected with the crank member 155 will contact a tooth 150' of the clutch lever 150 and will force said lever back into latching position, breaking the electric circuit and bringing the end of lever 150 into the path of movement of the rotating clutch pawl 153 to terminate the cycle.

As more fully disclosed in the above Crosman Patent 1,946,572, during operation by the plus bar 138, the accumulator shafts 403 (Fig. 1) will be moved away from the racks of levers 610 before said racks are allowed to move, and will be moved to reengage the gears 472 while the racks lie in the extreme positions permitted by the keys 215 and stop bars 615. As shaft 301 is returned and the racks are raised, the value set in the keyboard will be additively transferred to the register.

Suitable well known program devices for selecting one or more registers and for controlling the character of operations to be performed thereon in accordance with the tabulated positions of the platen carriage are provided, as is means for clearing the keyboard automatically, to effect line spacing, tabulating, and return movements of the platen carriage, all as set forth in more detail in the said Crosman Patent 1,946,572.

Figure 8:
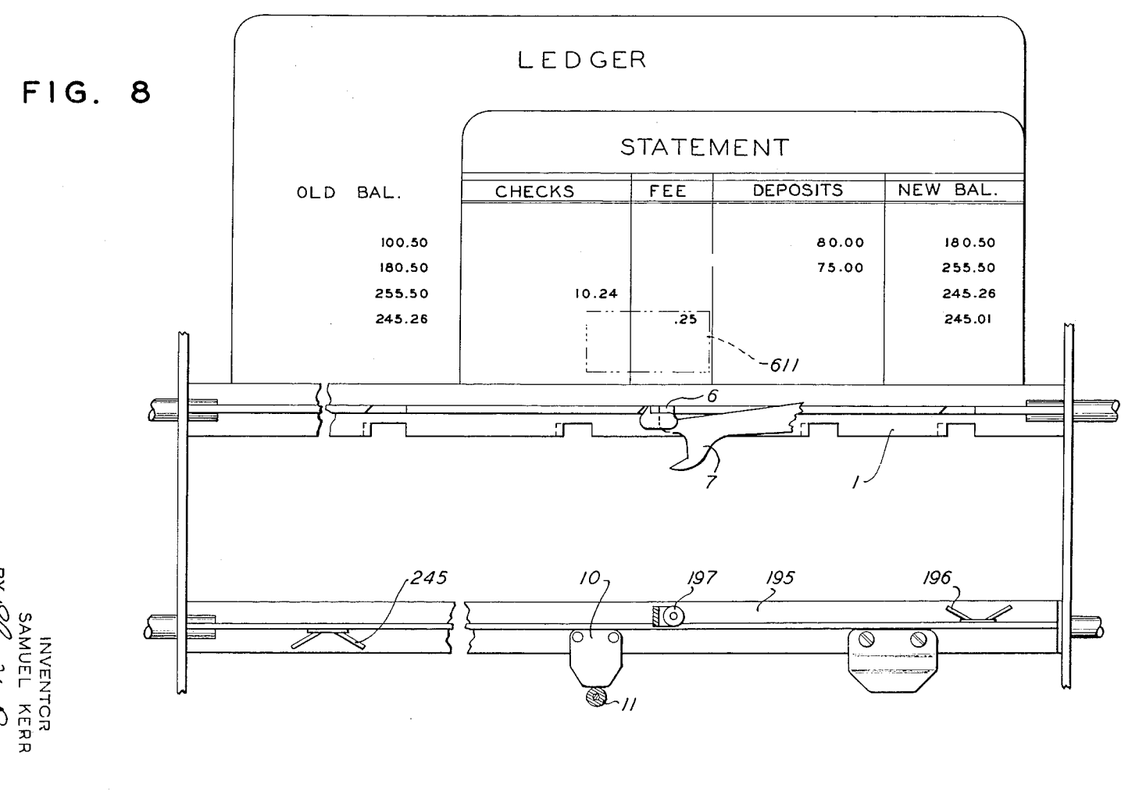
Fig. 8 illustrates one example of work and embodies the arrangement of control elements on the platen carriage to secure the automatic operations required for the illustrated example of work.

The more readily to understand the invention and a preferred manner and mode of operation to which the same may be used, the operations of the machine in performing a typical bank posting routine, such as the last line of entries illustrated in Fig. 8 will be described.

The ledger and statement forms are first inserted in usual manner upon the platen carriage and with the carriage in its extreme right hand position, so that the left hand or old balance column of the ledger sheet is in printing position relative to the type bars 611, the amount of $245.26 (being the amount carried forward from a previous operation) is set up on the digit keys 215 at the right of the keyboard and a machine cycle of operation is then initiated by depression of the plus bar 138. As will be apparent from the following description, this will be the only operation required of the operator. Thereafter the machine will operate to first register and print the old balance of $245.26 upon column one of the ledger sheet. The carriage then tabulates to the fees columnar position of the statement form where the machine automatically subtracts and prints a fixed fee of 25 cents, following which the carriage will tabulate to the new balance columnar position where an automatic total operation will print the new balance, after which the carriage is automatically returned to the first or old balance starting position, ready for a new entry.

Following the above printing operation of the old balance ($245.26) the usual keyboard clear means will effect a release of the depressed keys 215 in well known manner.

As more completely described in reference Patent 1,946,572, the platen carriage is tabulated from right to left under influence of a spring drum 8 (Fig. 7) connected thereto by a tape 9, the carriage being held in its various tabulating positions by means of a notched bar 1, the walls of the notches forming spaced stops 193 engageable successively by the end 6 of a detent 7 pivotally supported upon a lever 20 pivotally mounted at 21 to the rear casing of the machine. The detent 7 is disengaged from bar 1 near the end of the machine cycle of operation following a printing of the old balance, by the downward movement of a member 184 operated by shaft 164 (Fig. 6) through cam arm 316 in known manner. Upon release of bar 1 by the end 6 of detent 7, the carriage will be pulled toward the left (toward the right as viewed in Fig. 7) by the spring drum 8, and the detent being immediately released by the member 184, will rise and ride on the under edge of bar 1. The carriage thereafter moves sufficiently to bring an adjacent suitably spaced one of the stop notches 193 of bar 1 into register with the end 6 of the detent 7 to arrest the carriage with the Fees column of the statement form in printing position.

For controlling a setting of the accumulators automatically in accordance with the columnar positions of the carriage, program mechanism is provided, as described in detail in Patent 1,946,572, wherein reengagement of tabulating bar 1 with the end 6 of detent 7 following a carriage movement serves to effect release of clutch devices controlling power means for causing operation of suitable sensing plungers 83—85. Plungers 83—85 cooperate with related orifices in a tubular bar 82 carried by the platen carriage to effect both a register selection and control of the character of operation to be performed thereon which, with the paper carriage in the fees columnar position for the illustrated example, will set said controls for effecting a subtract operation, as hereinafter described.

*Means for effecting automatic fixed fee entry*

Secured to the well known flanged bar 195 (Figs. 2 and 7), mounted for rotatable adjustment in the carriage end frames, is a cam member 10 so positioned on the bar 195 that as the carriage comes to rest with the Fees column of the statement form sheet in printing position said cam will engage and depress a roller 11 secured to a rearwardly extending arm of a bell crank lever 12, loosely mounted upon a transverse shaft 13 supported in the right and left end framing of the machine. The other arm of bell crank lever 12 has link connection 14 with the lower end of a lever 15 pivotally mounted upon a transverse shaft 16. The upper end of lever 15 engages the forward surface of a lug 17 bent laterally of an arm 18 fast to a shaft 19, pivotally supported within the framing of the keyboard structure. Fast upon shaft 19 are two downwardly extending arms 22 and 23 respectively, arm 22 being positioned forwardly of the upward end 148' of the cyclic clutch latch 148, while arm 23 is provided with a pin 24 having engagement with an upwardly extending arm of a bell crank lever 25 pivotally mounted at 26 upon a suitable sub-framing structure of the keyboard.

Figures 3, 4, 5:
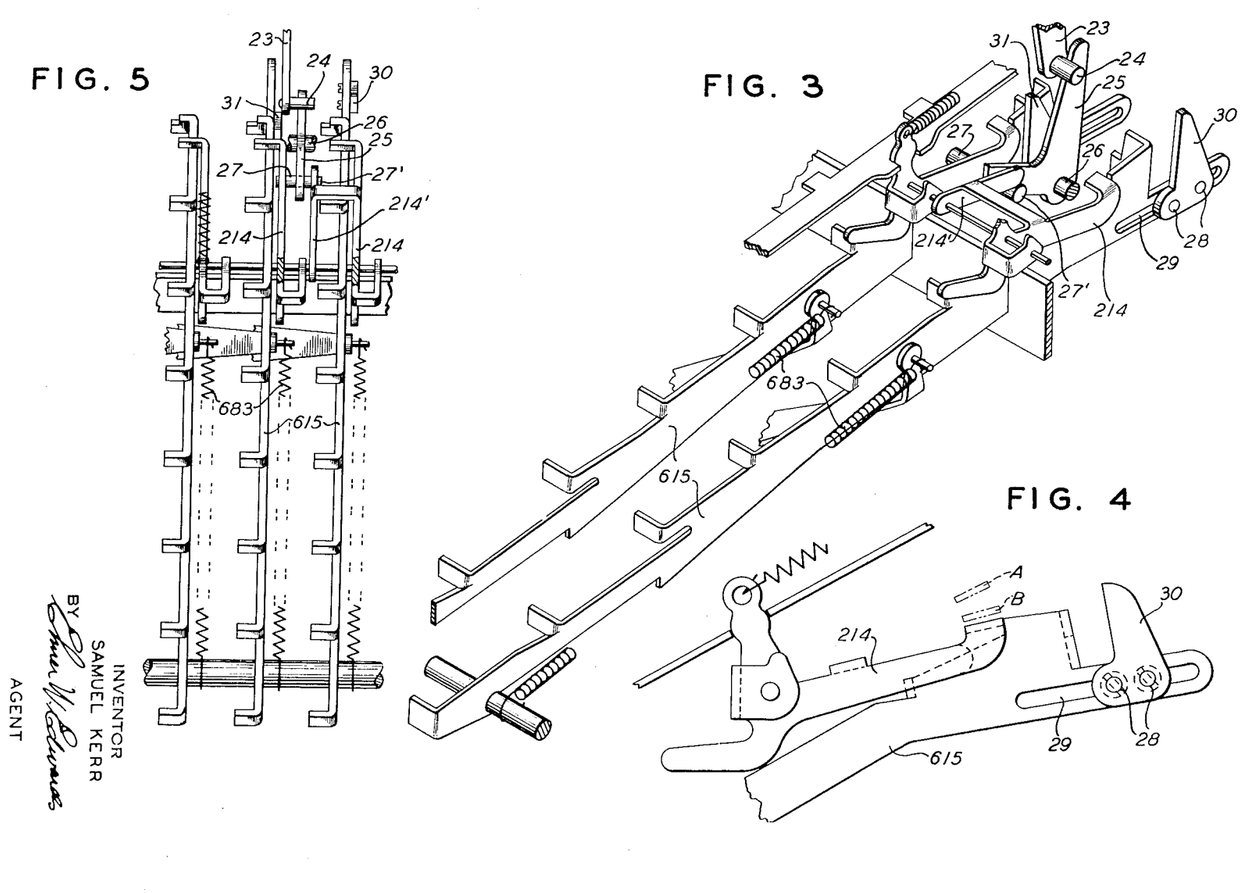
Fig. 3 is a right hand perspective of the units and tens order column latches and related differential stop bars.
Fig. 4 is a detail view illustrating the units and tens order column latches in various positions of adjustment.
Fig. 5 is a plan view of parts shown in Fig. 4.

As best seen in Fig. 5, the forward arm of bell crank lever 25 is provided with a pin 27 extending leftward and beneath the column latch 214 related to the tens order stop bar 615, while a corresponding pin 27' extends toward the right from bell crank lever 25 and is positioned beneath a laterally offset arm 214' formed on the units order column latch 214. Upon the described depression of roller 11 by the carriage arm 10, lever 12, through link 14, imparts a clockwise movement to lever 15 and thereby a counterclockwise movement to arm 18, shaft 19, and the arms 22 and 23.

In the above-described counterclockwise movement of arm 22, the pins 27—27' will lift the tens and unit order column latches 214 to the position "B" (illustrated in dotted lines of Fig. 4), which position B is intermediate the adjustment of said latches to position A by the depression of digit keys 215, but is, however, sufficient to release the said latches from their related differential stop bars 615.

Secured, by means of shouldered screw studs 28 extending through suitable slotted openings 29, to the rearward end of the units order and tens order stop bars 615 are stop members 30—31 respectively. The stop members 30—31 project upwardly from the bars 615 and are constructed so that in any operations of said bars with the higher digit values set up on the units and tens order keys 215 they will pass beneath the raised position A of the units and tens order column latches 214 to permit a movement of said bars until stopped by the depressed keys 215. However, if no units or tens order key 215 is depressed with the carriage in the fees columnar position, the carriage cam 10 will lift and hold the units and tens order latches 214 to the intermediate position B, free of the zero stops of bars 615. During a forward movement of the units and tens order stop bars 615 stop members 30—31 are now adapted to contact their related latches 214 and will limit the movement of said bars in accordance with a preadjusted value setting of said stop members in the slotted openings 29. In the present instance the stop member 30 of the units order bar 615 is spaced to limit a forward movement of said bar to five steps before engaging its related column latch 214 while the tens order stop 31 is spaced to limit the tens order bar 615 a two steps of movement. Thus, in the illustrated example, an amount of 25 cents is caused to be entered automatically into the register wheels and printing type means upon operation of the cyclic clutch devices when the paper carriage is in the fees columnar position.

In the counterclockwise operation of arm 22 through depression of roller 11 by the carriage cam 10, above described, said arm will impart a clockwise movement to the latch 148 to release clutch lever 150 and thereby automatically initiate an operation of the cyclic clutch means.

It will be recalled, however, that a carriage shifting operation is always followed by an automatic operation of the clutch means related to the power devices for controlling a register selection and the character of operation to be performed thereon. Suitable interlock means 276 and 33 operable with said clutch means therefor, as fully set forth in reference Patent 1,946,572, will delay the lever 150 from effecting engagement of the machine cyclic clutch until after a carriage shifting operation and automatic selection cycle have been completed.

Operation of the register selection clutch with the carriage in the fees columnar position conditions the register control devices in well known manner so that upon an operation of the machine cyclic clutch the accumulator gears 472 will remain in engagement with the racks 610 in the forward movement of said racks and are moved out of engagement therewith prior to the return movement thereof to effect a subtractive operation of the accumulator wheels when the carriage is in the fees columnar position.

Following the automatic value entering operation, the platen carriage again tabulates in usual manner, until brought to rest by a suitable notched opening 193 in the tabulating bar 1 related to the new balance columnar position of the statement sheet. During the above carriage movement, the cam 10 will release roller 11, permitting levers 22—23 to release the column latches 214 and the latch 148, whereupon latch 148 is restored by its spring 149 for reengagement with the clutch lever 150 while the units and tens order column latches 214 are restored through suitable springs to normal engaging position with their respective stop bars 615.

It will be noted that at the completion of an automatic value entering cycle of operation the carriage cam 10 continues to hold roller 11 in its depressed position until after the carriage starts its tabulating movement toward the new balance columnar position and thus holds the latch 148 from reengaging with clutch lever 150, thus preventing said lever from terminating the cycle of operation. Near the end of a cycle of operation, however, arm 155' of crank arm 155 engaging tooth 150' of lever 150 imparts sufficient movement in restoring said lever to withdraw a projection 267 thereof from beneath the interlock lever 276 of Patent 1,946,572 so that lever 276 is rocked into position rearwardly of projection 267 to block a second clockwise movement of lever 150. As fully described in said Patent 1,946,572, completion of the carriage tabulating movement trips the register selection clutch control lever 33 to effect operation of the program control devices. Upon release, said lever 33 is first rocked upwardly, by suitable spring means, to block movement of lever 150 while also restoring lever 276 upon projection 267 of lever 150. Thereafter, lever 33 is restored downwardly by suitable cam means operable with the selection clutch, to release said lever 33 from engagement of lever 150, whereupon lever 150 is then limited against counterclockwise movement by reengaging the now restored latch member 148.

Figure 6:
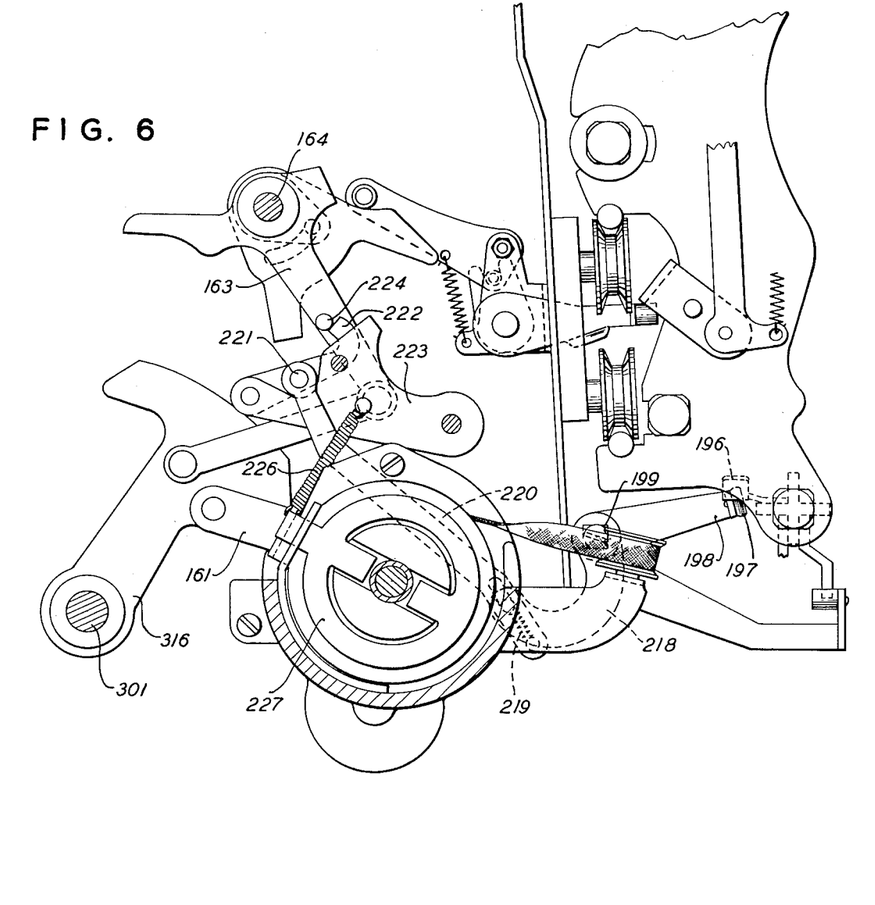
Fig. 6 is a right side elevation of means for effecting tabulating and return movements of the carriage.
Figure 7:
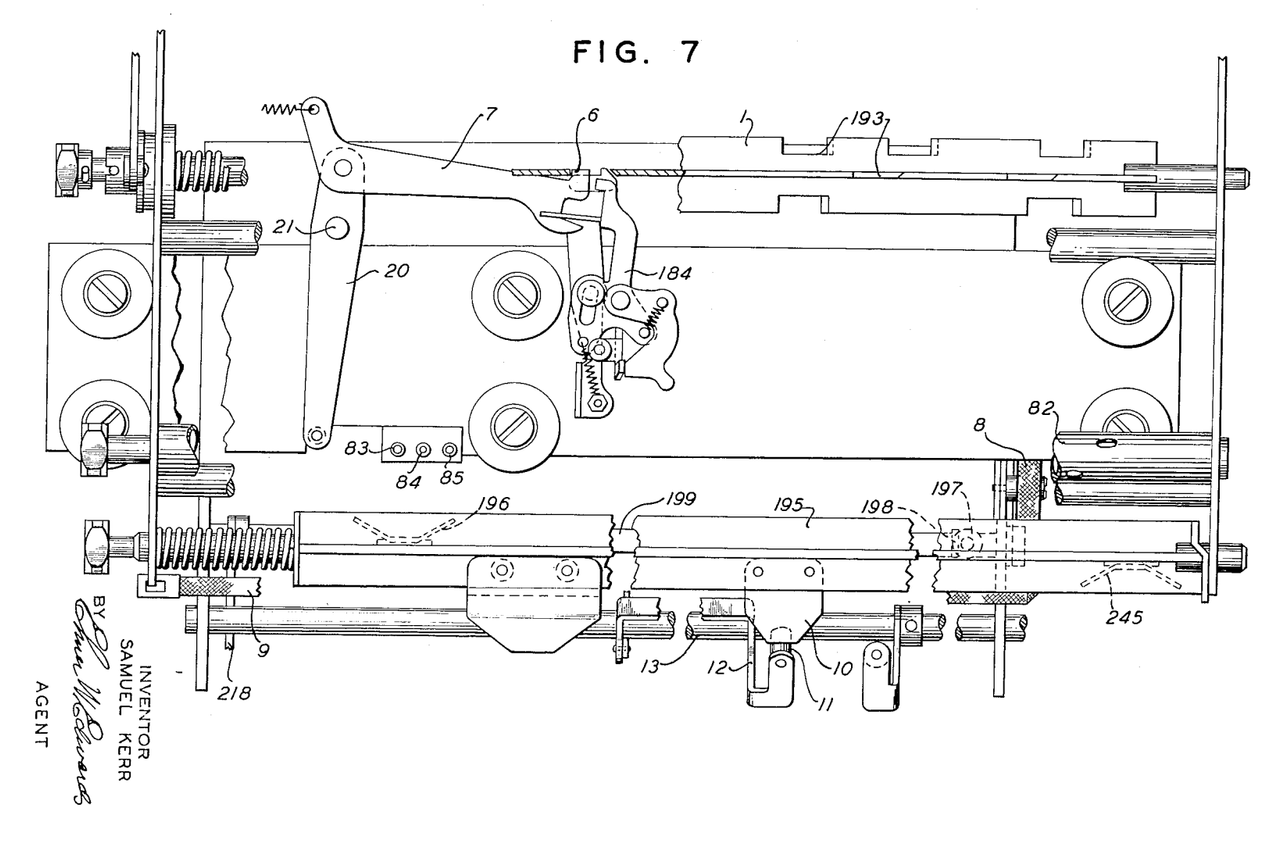
Fig. 7 is a rear elevation of carriage tabulating means and showing control elements on the carriage for effecting automatic machine operations and carriage movements.

As the platen carriage tabulates into the new balance columnar position, a suitable cam member 196 (Figs. 6 and 7) on the bar 195 engages roller 197 of an arm 198 fast to a square shaft 199, pivoted within the left and right end framing of the machine to impart a clockwise movement to said shaft (Fig. 6). Clockwise movement of shaft 199 will effect an automatic depression of the total key, as set forth in U. S. patent of reference, 1,994,211, whereby all the column latches 214 are lifted to the position A of Fig. 4 while pin shaft 607 (Fig. 1) is caused to rotate and trip the dogs 617 to release the differential stop bars 615 and allow the segment racks 610 to rotate subtractively until suitable pins on the accumulator wheels contact with zero stop members. This will set the total (the amount subtracted from the accumulator wheels) in the type bars and the hammers will then be tripped to print the new balance total (245.21) upon the statement sheet, all in well known manner set forth in Patent 1,994,211, to which reference is made for details of structure and operation not herein described.

Also, as more fully described in the above reference patents, a clockwise movement of shaft 199 imparts an upward movement to a forwardly extending arm 218, secured to the right hand end of said shaft. Arm 218 has yieldable spring connection 219 with a link 220 pivotally connected at 221 with a hook member 222 pivotally mounted to a rock plate 223. Upon operation of arm 218 spring 219 will be tensioned upwardly to urge hook 222 against a stud 224 carried by the power operated arm 163 fast to the shaft 164. During the total printing cycle of operation above described, arm 163, moving forwardly, carries stud 224 forwardly therewith, free of the top surface of hook 222, and spring 219 will thereupon raise the hook so that upon return movement of arm 163 stud 224 will engage the forward surface of said hook and impart a counterclockwise movement to the plate 223. Plate 223 has flexible link connection 226 with the operating control means 227 of the well known carriage return clutch, whereby the above operation of plate 223 will effect operation of said clutch to automatically return the platen carriage toward the left until stopped as hook 222 is pulled out of engagement with stud 224 by restoration of shaft 199 and arm 218, through means of a cam shoe 245 positioned on bar 195 relative to the old balance columnar position; and the posting operation is now completed, with the machine again in a condition for further entries. In the event there are no further special fee entries to be made, the bar 195 may be rotated in well known manner to displace cam 10 out of cooperating condition relative to roller 11 and thus permit use of the full capacity of the keyboard for other operations.

As above set forth, therefore, the invention provides novel and extremely simple control devices whereby selected column latches are automatically operated by the platen carriage in a selected columnar position thereof to permit of an operation and control of the extent of movement of the register actuator means whereby a selective fixed value may be automatically entered in the register and recorded upon suitable record sheets, and whereby operation of said control devices for said latches also effects an operation of the cyclic clutch means to cause an automatic machine cycle of operation.

Having now described the invention and one manner of use to which the same may be put, what I claim is:

1. In a listing calculating machine, the combination of register means, printing means including a plurality of type members, a plurality of differential actuators for the register and for bringing the type members to printing line position, cyclic operating means for imparting a registering movement to the differential actuators, a traveling paper carriage, column latches positioned to normally prevent a registering movement of said actuators during operations of the cyclic operating means, a stop member for each of one or more selected differential actuators spaced relative to the related column latches thereof for controlling a value registering movement of said selected actuators, control means for said related column latches operable by the paper carriage independent of an operation of the cyclic operating means and adapted for adjusting the said related column latches from said registering preventing position into an effective position for engagement thereof by the said related stop member in a subsequent operation of the cyclic operating means, and wherein said column latches in said adjusted position will limit the movement of said selected actuators in accordance with a preselected value as determined by the spaced position of said stop members relative to their respective column latches, and means on the paper carriage for automatically operating the said column latch control means by a movement of the paper carriage.

2. In a listing calculating machine, the combination of register means, printing means including a plurality of type members, a plurality of differential actuators for the register and for bringing the type members to printing line position, cyclic operating means for imparting a registering movement to the differential actuators, a traveling paper carriage, column latches for said actuators positioned to normally control a zero registering movement of said actuators in operations of the cyclic operating means, means for controlling a valve registering movement of selected actuators including a stop member adjustably secured to each of one or more selected differential actuators and predeterminedly set relative to the related columnar latch thereof, a control train operable by the paper carriage for moving said related column latches independent of the cyclic operating means from said zero registering control position and into cooperative position for engagement thereof by the related stop member of the selected actuator to thereby limit subsequent operation of said selected actuators in accordance with said predetermined setting of said stop members, and means on the paper carriage for automatically operating said independent control train whereby the said movement of said related column latches will be effected by a movement of the paper carriage prior to an operation of said cyclic operating means.

3. In a listing calculating machine the combination of register means, printing means including a plurality of type members, a plurality of differential actuators for said register means and for adjusting said type members to printing line position, a traveling paper carriage, cyclic operating means including a clutch for imparting a registering movement to the differential actuators, column latches for normally restraining a registering movement of the differential actuators at zero during operations of said cyclic operating means, control stops movable with one or more selective differential actuators, control devices for adjusting the column latches related to said selective actuators from said restraining position and into active position relative to said stops whereby said stops in a cycle of operation will cooperate with said latches to limit a registering operation of said selective actuators in accordance with a preselected fixed value as determined by the spaced relation of said stops to their respective column latches, means operable by said column latch control devices during said adjustment of the selective column latches to effect release of the cyclic operating clutch for an automatic cycle of operation, and means on the paper carriage for cooperating with said control devices to effect said adjustment of said selective column latches and for releasing said cyclic operating clutch to cause an automatic registration and printing of said fixed value.

4. In a listing calculating machine having registering means, printing means including a plurality of type members, a plurality of differential actuating means for the registering means and for bringing the type members to printing position, a traveling paper carriage, cyclic operating means for imparting movement to said actuating means, column latches for said actuating means positioned normally to prevent a registering movement of the related actuating means during operations of the cyclic operating means, banks of manipulative amount setting keys adapted for adjusting the related column latches away from said actuating means to permit operation of said actuating means in accordance with a value setting of said keys, the combination of control devices operable by the traveling carriage independently of said cyclic operating means and adapted for automatically adjusting selected of said column latches to a position intermediate of said normal and said key adjusted positions, and value determining means movable with the actuating means related to said selected column latches and cooperable with said latches in the said intermediate adjusted position to limit a movement of the related actuating means in accordance with a predetermined value setting of said value determining means.

5. In a listing calculating machine having registering means, printing means including a plurality of type members, a plurality of differential actuating means for said registering means and for moving the type members to printing position, a traveling paper carriage movable to a plurality of columnar positions to bring selective columns of a form sheet opposite said printing means, cyclic operating means for imparting a registering movement to the actuating means, zero column latches for normally preventing any registering movement of said actuating means during cyclic operations, manipulative plural order value setting keys adapted for lifting their related column latches and thereby permitting subsequent operations of said actuating means for registering and printing of values in accordance with value settings of said keys, the combination therewith of a value control stop mounted upon selective orders of said differential actuating means, a control train operable by said paper carriage independent of said cyclic operating means and adapted for automatically adjusting the related column latches for said selective differential actuating means from its zero control position into a cooperative position relative to said value control stops to limit a subsequent registering movement of said actuators in accordance with a predetermined value position setting of said stops, and cam means positioned on the paper carriage to effect an operation of said control train as said carriage moves into a predetermined columnar position.

6. The invention according to claim 5 wherein said cam member is adjustable to effective or to ineffective position of cooperation relative to said control train for enabling or disabling said automatic predetermined value registration with the paper carriage in said predetermined columnar position.

7. In a listing calculating machine the combination of register means, printing means including a plurality of type members, a plurality of differential actuators for said register and for bringing the type members selectively to printing line position, cyclic operating means including a clutch for imparting a registering movement to said actuators, a traveling paper carriage movable to a plurality of columnar positions, zero columnar latches for normally restraining said actuators against a registering movement, denominational banks of digit keys adapted to release said column latches from said normally restraining position, differentially spaced stops movable with said actuators and cooperable with a depressed digit key to govern the extent of movement of the related actuator in accordance with the value of said depressed key, a secondary stop member adjustably secured upon selected of said actuators and adapted for pre-adjustment relative to the related column latches, a member adapted for rocking one or more of said latches out of said zero-restraining position and to effective position for subsequent engagement thereof by said secondary stop in operations of said cyclic operating means to control a value registering movement of the related actuators, cyclic clutch release means, control devices common to both the said latch adjusting member and said clutch release means, and means on the paper carriage for operating said control devices to effect a concurrent adjustment of said column latches with release of said clutch by a movement of the paper carriage into a predetermined columnar position.

8. In a listing calculating machine the combination of a register means, printing means including a plurality of type members, a plurality of actuators for said register and for bringing the type members to printing line position, cyclic operating means including a clutch for imparting a registering movement to said actuators, a traveling paper carriage movable to a plurality of columnar positions, denominational banks of manipulative amount setting keys, a stop bar movable with each of said actuators having lugs thereon differentially spaced relative to said amount keys to limit an operation of said actuators in accordance with the value of a depressed key, a zero projection on said stop bars, column latches for said stop bars normally cooperable with said projection to restrain a value registration of the related actuator at zero, a secondary stop member mounted for longitudinal adjustment in accordance with a predetermined value upon the units and the tens orders of said stop bars, said stop member extending through and beyond the path of movement of said zero projection, means operable by said amount keys for adjusting the column latches out of said zero restraining position and beyond the path of movement inscribed by said secondary stop member in a movement of its related actuator when limited by a depressed amount key, adjusting means for the units and the tens order column latches including a member operable by the paper carriage in a movement thereof to selective columnar positions to adjust the said units and tens order column latches out of said cooperative position with said related zero projections and into a position intermediate of the adjustment of said column latches by a depressed value key prior to an operation of said cyclic operating means, and wherein said latches in said intermediately adjusted position will cooperate with the said secondary stop member to control a registering movement of said actuators in accordance with a predetermined value setting of said secondary stop member, a control train for said intermediate position adjusting means, and a cam member mounted upon said traveling paper carriage adapted to effect operation of said control train independently of the cyclic operating means upon a movement of said carriage to a predetermined columnar position.

9. In a listing calculating machine the combination of a register means, printing means including a plurality of type members, a plurality of actuators for said register and for bringing the type members to printing line position, cyclic operating means including a clutch for imparting a registering movement to said actuators, a traveling paper carriage movable to a plurality of columnar positions, denominational banks of manipulative amount setting keys, a stop bar movable with each of said actuators having lugs thereon differentially spaced relative to said amount keys to limit an operation of said actuators in accordance with the value of a depressed key, a zero projection on said stop bars, column latches for said stop bars normally cooperable with said projection to restrain a value registration of the related actuator at zero, a secondary stop member mounted for longitudinal adjustment in accordance with a predetermined value upon the units and the tens orders of said stop bars, said stop member extending through and beyond the path of movement of said zero projection, means operable by said amount keys for adjusting the column latches out of said zero restraining position and beyond the path of movement inscribed by said secondary stop member in a movement of its related actuator when limited by a depressed amount key, adjusting means for the units and the tens order column latches including a member operable to adjust the said units and tens order column latches out of said cooperative position with said related zero projections and into a position intermediate of the adjustment of said column latches by a depressed value key, and wherein said latches in said intermediately adjusted position will cooperate with the said secondary stop member to control a registering movement of said actuators in accordance with a predetermined value setting of said secondary stop member, a control train for said intermediate position adjusting means, and a cam member mounted upon said traveling paper carriage adapted to effect operation of said control train upon a movement of said carriage to a predetermined columnar position, a cyclic clutch release train, a member in said train common to said intermediate position adjusting means for the units and tens order column latches and the said clutch release means, and wherein said common member in an operation of said control train for adjusting the said column latches to said intermediate position also releases the said cyclic clutch and thereby effects an operation of said cyclic operating means to automatically register and print said predetermined value.

References Cited in the file of this patent

UNITED STATES PATENTS

| | | |
|---|---|---|
| 2,637,494 | Fettig | May 5, 1953 |
| 2,646,922 | Sime | July 28, 1953 |
| 2,678,161 | Fleming | May 11, 1954 |